W. LA HODNY.
MOUNTING FOR SUPPORTING MIRRORS.
APPLICATION FILED MAY 1 1920. RENEWED MAY 23, 1922.
1,428,042. Patented Sept. 5, 1922.
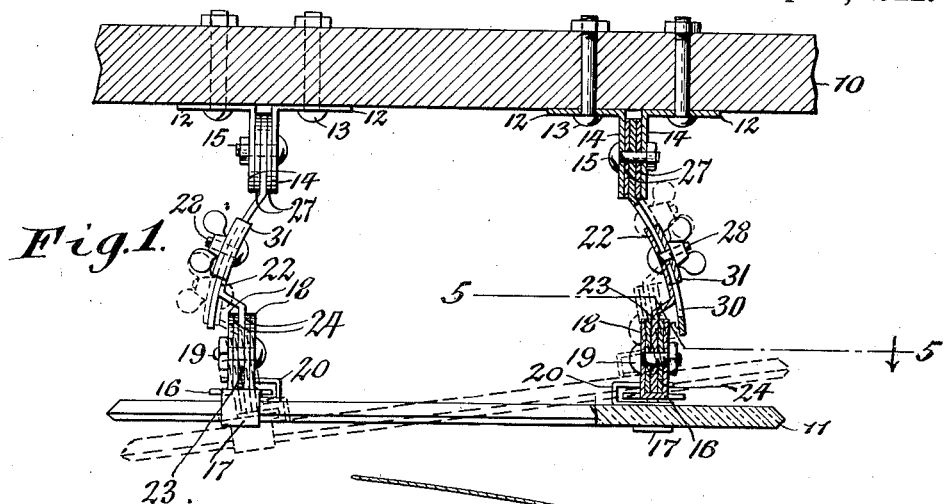
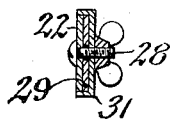
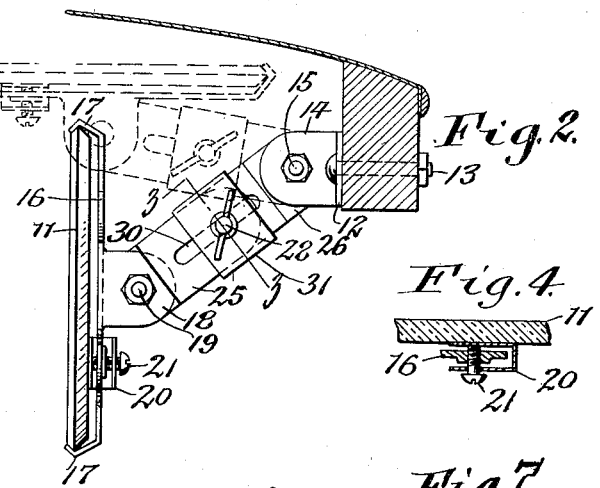
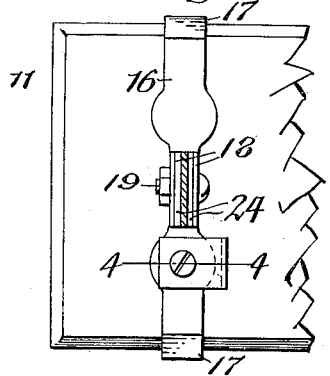
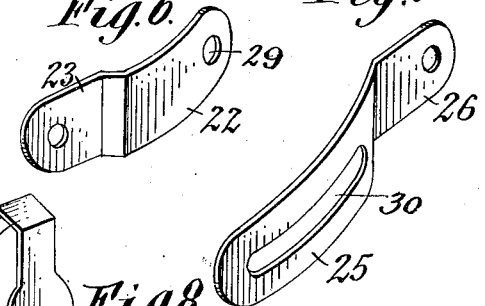
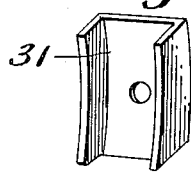
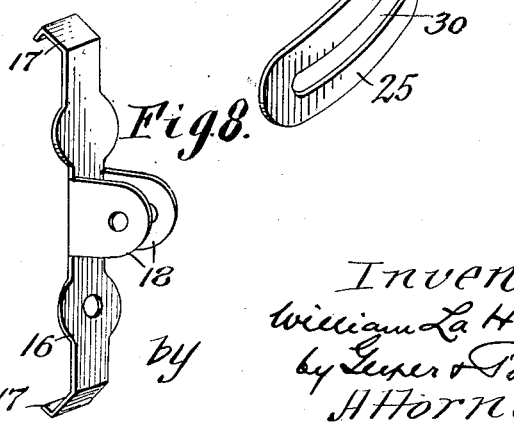
Inventor
William La Hodny
by Lexer & Popp
Attorneys Patented Sept. 5, 1922.

1,428,042

UNITED STATES PATENT OFFICE.

WILLIAM LA HODNY, OF BUFFALO, NEW YORK.

MOUNTING FOR SUPPORTING MIRRORS.

Application filed May 1, 1920, Serial No. 378,166. Renewed May 23, 1922. Serial No. 563,122.

*To all whom it may concern:*

Be it known that I, WILLIAM LA HODNY, a citizen of the United States, residing in Buffalo, in the county of Erie and the State of New York, have invented new and useful Improvements in Mountings for Supporting Mirrors, of which the following is a specification.

This invention relates to a mounting for supporting a mirror on the top or canopy of an automobile so that the driver can observe the traffic on the road in his rear and thus govern himself accordingly.

One of the objects of this invention is to provide a mounting of this character which is more particularly designed for supporting comparatively long or large mirrors efficiently and properly. Another object of this invention is to provide a support which will securely hold the mirror against undue vibration and yet permit of adjusting the same readily at the desired angle to reflect the best view toward the rear without complicating the structure or making the same objectionable in weight.

In the accompanying drawings: Figure 1 is a top plan view partly in section, showing my improved mounting employed for supporting a mirror on the front bar of an automobile top or canopy. Figure 2 is a sectional side elevation thereof. Figure 3 is a section on line 3—3, Fig. 2. Figure 4 is a section on line 4—4, Fig. 5. Figure 5 is a fragmentary longitudinal section taken on line 5—5, Fig. 1. Figures 6, 7, 8 and 9 are perspective views of some of the main parts of the mirror mounting embodying my invention.

Similar characters of reference refer to like parts throughout the several views.

10 represents the front horizontal bar of an automobile top or canopy and 11 a mirror which is mounted on this bar by means of the mounting constructed in accordance with my improvements.

In its general organization the mounting comprises two adjusting arms which are arranged side by side and transversely between the mirror and the top bar, an attaching base which is adapted to be secured to the top bar and upon which the rear ends of said arms are pivoted to swing vertically, and two supporting heads which are secured to the mirror adjacent to opposite ends thereof and are pivoted to the front ends of said arms to swing vertically.

The attaching base preferably comprises two pairs of base plates 12 which are connected with the top bar by means of bolts 13 or otherwise the members of each pair of plates being provided on their opposing ends with transverse pivot lugs 14 which are connected with each other by a horizontal longitudinal pivot bolt 15.

Each of the supporting heads comprises an upright supporting plate 16 which is arranged in rear of the mirror and provided at its upper and lower ends with hooks 17 engaging over the corresponding edges of the mirror while its central part is provided with a pair of rearwardly projecting lugs 18 which are connected by a horizontal pivot bolt 19. The supporting head is held in place on the mirror by a clamp having a U-shaped body 20 which straddles the plate of the supporting head, and a clamping screw 21 engaging its threaded shank with a threaded opening in the supporting head plate and bearing at its front end against the front leg of the clamp body for pressing the same against the back of the mirror and passing with its rear part through a plain opening in the rear leg of the clamp, as shown in Figs. 4 and 5.

Each of the adjusting arms comprises two sections which are capable of longitudinal adjustment relatively to each other and are pivotally connected with the attaching base and the supporting heads. The sections of each arm are arranged generally in a position transversely between the mirror and top bar so that one section forms the front part and the other the rear part of the respective arm. Each front arm section has a curved rear part 22 and a transverse front extremity 23 which latter is mounted on the front pivot bolt 19 between the lugs 18 and separated from the latter by interposed friction washers 24. Each rear arm section has a curved front part 25 and a rear extremity 26 which latter is mounted on the adjacent pivot bolt 15 between the lugs 14 and separated from the latter by interposed friction washers 27. The opposing curved parts of the sections of each arm overlap each other and the axis of the curvature of the curved parts of each arm is arranged adjacent to the front end of the other adjusting arm where the latter is connected with the mirror. The curved parts of the sections of each arm are adapted to slide lengthwise upon each other for varying the length of this arm and these sections are held in the desired position by means of clamping bolts 28 passing through corresponding holes 29 and a longitudinal slot 30 formed in the front and rear sections of each supporting arm. The two sections of each arm are held in longitudinal alinement with each other by means of a U-shaped clip 31 which straddles the opposing curved parts of each arm and engages its legs with the longitudinal edges thereof and is provided in its cross piece with an opening which receives the respective clamping bolt 28.

By swinging the arms up or down and turning the heads on the arms the mirror can be brought to various heights and retained either in a vertical position or in a more or less tilted position best suited for use, as shown for instance by full lines in Fig. 2.

Or the arms and heads may be turned so as to fold the mirror close to the roof of the canopy when the same is not required, as shown by dotted lines in Fig. 2. In the event that the mirror requires shifting horizontally in an angular position to secure the desired reflection from the rear of the car, as shown for instance by the dotted lines in Fig. 1, this can be accomplished by loosening one or both of the clamping bolts or screws 28 and sliding the curved parts of the sections of either one or both arms lengthwise upon each other so as to shorten or lengthen one or both of these arms the requisite extent for bringing the mirror to the desired angular position after which the bolts 28 are again tightened to hold the parts in place. The lengthening or shortening of one of the adjusting arms without injuriously deflecting any parts is possible by reason of the curved parts of each arm being struck on an arc which has its center located adjacent to the front end of the other adjusting arm and the resilience of the arms and associated parts which are made of sheet metal.

By supporting the mirror at both ends the same is firmly held against undue vibration and thus enables the driver to obtain a good rear view at all times and promote safety in automobile driving.

I claim as my invention:

1. A mounting for supporting a mirror comprising two supporting arms which are arranged transversely and side by side and each of which has adjustable members which are slidable lengthwise on each other for varying the length of the respective arm, means for mounting the rear ends of said arms on a fixed support, and means for mounting a mirror on the front ends of said arms, the adjustable members of each of said arms having parts which are curved on an axis arranged adjacent to the front end of the other arm.

2. A mounting for supporting a mirror comprising two adjusting arms arranged transversely side by side, and each composed of front and rear sections, the opposing ends of which overlap and are curved while the respective front and rear extremities of the same are arranged transversely, means for clamping the overlapping parts of each arm together, and means for pivotally connecting the front and rear ends of said arms to a mirror and a support, respectively.

3. A mounting for supporting a mirror comprising two adjusting arms arranged transversely side by side and each composed of front and rear sections the opposing ends of which overlap and are curved on an axis arranged adjacent to the front end of the other arm, means for adjustably connecting the overlapping parts of each arm, and means for pivotally connecting the front and rear ends of said arms with a mirror and a support, respectively.

4. A mounting for supporting a mirror comprising two adjusting arms arranged transversely side by side and each composed of front and rear sections the opposing ends of which overlap and are curved on an axis arranged adjacent to the front end of the other arm, means for adjustably connecting the overlapping parts of each arm, comprising a clamping bolt passing through an opening and a longitudinal slot in said overlapping parts, and means for pivotally connecting the front and rear ends of said arms with a mirror and a support, respectively.

5. A mounting for supporting a mirror comprising two adjusting arms arranged transversely side by side and each composed of front and rear sections, the opposing ends of which overlap and are curved on an axis arranged adjacent to the front end of the other arm, means for adjustably connecting the overlapping parts of each arm comprising a clamping bolt passing through an opening and a longitudinal slot in said overlapping parts, a U-shaped clip mounted on each of said bolts and embracing said overlapping parts from opposite edges thereof, and means for pivotally connecting the front and rear ends of said arms with a mirror and a support, respectively.

6. A mounting for supporting a mirror comprising two adjusting arms arranged transversely side by side and each consisting of two sections the opposing parts of which are provided with a co-operating opening and longitudinal slot and curved on an axis arranged adjacent to the front end of the other arm and front and rear extremities being arranged transversely relatively to said support and mirror, attaching base members which are adapted to be connected with a support and to which the rear extremities of said arms are pivoted, and supporting head members which are connected with said mirror and to which the front extremities of said front arm sections are pivoted, a U-shaped clip embracing the overlapping parts of each arm, and a clamping bolt passing through said clip and the opening and slot of the corresponding arm sections.

WILLIAM LA HODNY.